(12) United States Patent
Mackrell et al.

(10) Patent No.: US 8,423,440 B1
(45) Date of Patent: Apr. 16, 2013

(54) SYSTEMS AND METHODS FOR FACILITATING TRANSFERS BETWEEN ACCOUNTS

(75) Inventors: Bryan L. Mackrell, Pittsburgh, PA (US); Michael Ley, Moon Township, PA (US); Peter Ehling, Chicago, IL (US); Michael Aaron Chapman, Chicago, IL (US); Mark Alexander Jones, Evanston, IL (US); Rodney Hal Monson, Waukegan, IL (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 872 days.

(21) Appl. No.: 12/363,921

(22) Filed: Feb. 2, 2009

Related U.S. Application Data

(60) Provisional application No. 61/025,453, filed on Feb. 1, 2008.

(51) Int. Cl.
*G06Q 40/00* (2012.01)

(52) U.S. Cl.
USPC .......................................................... 705/35

(58) Field of Classification Search ............... 705/35–45
See application file for complete search history.

(56) References Cited

U.S. PATENT DOCUMENTS

| 7,356,505 B2 * | 4/2008 | March ............................. 705/39 |
| 2004/0039701 A1 * | 2/2004 | Nakamura et al. .............. 705/42 |

* cited by examiner

*Primary Examiner* — Richard C Weisberger
(74) *Attorney, Agent, or Firm* — Jonathan C. Parks, Esq.; Pietragallo Gordon Alfano Bosick & Raspanti, LLP

(57) ABSTRACT

A computer assisted method for facilitating transfers between financial accounts. The method includes accepting a funds transfer request via the selection of an icon, by a user, wherein the icon represents a designated transfer of a predetermined amount of funds between a funding account and at least one receiving account. The method further includes transferring the amount of funds from the funding account to the at least one receiving account.

19 Claims, 6 Drawing Sheets

FIG. 2

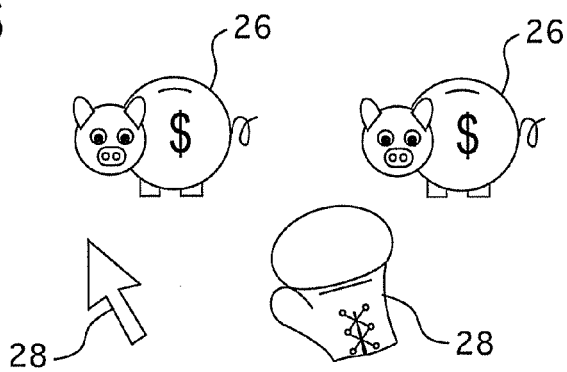
FIG. 6
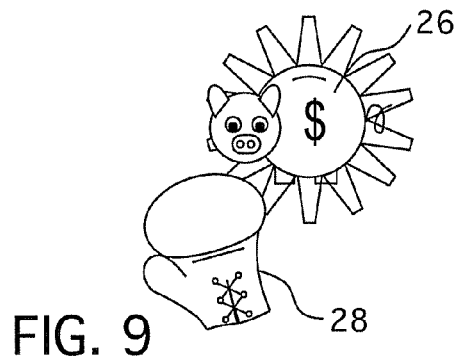
FIG. 8
FIG. 9
FIG. 10

| | | | | | Sign Off |
|---|---|---|---|---|---|
| My Account | Transfer Funds | Profile Settings | My Others | 🐷$ | |

| My Money: $1491.30 | Growth: $3288.00 | CreditCard: $200.84 | Other: $5311.00 | Liability: $200.34 | Assets: $9,932.86 |
|---|---|---|---|---|---|

| Calendar | Account Detail | Recent Activities | Bills | Savings Center | Alerts |
|---|---|---|---|---|---|

*My Total Saved: $350.00*

Help me save more money

On these intervals  (Add Rule)  — 40

On/Off  Frequency     $        Account Type    Saving Location

☐                                                               (Edit)

Savings History                                       ⊗   (Edit)

Total Savings: $50.00

| Date | Number of Punches | Transfer Amount | Daily Savings | Total Savings |
|---|---|---|---|---|
| Pending | 2 | $5.00 | $10.00 | $50.00 |
| 09/28/2007 | 1 | $5.00 | $5.00 | $40.00 |
| 09/18/2007 | 2 | $5.00 | $10.00 | $35.00 |
| 09/17/2007 | 1 | $5.00 | $5.00 | $25.00 |
| 09/17/2007 | 1 | $5.00 | $5.00 | $20.00 |
| 09/16/2007 | 2 | $5.00 | $10.00 | $15.00 |
| 09/15/2007 | 5 | $1.00 | $5.00 | $5.00 |

◀ Page 1 of 3 ▶

☑    Save   $1.00   from   Available   to   Growth        (Edit)

Show me the Pig

○ All the time

● Surprise me!

Total saved with this method: $50.00              Detailed History

FIG. 11

SYSTEMS AND METHODS FOR FACILITATING TRANSFERS BETWEEN ACCOUNTS

CROSS REFERENCE TO RELATED APPLICATION

The present application claims priority to U.S. Provisional Patent Application No. 61/025,453 filed on Feb. 1, 2008.

BACKGROUND

Personal savings rates in the United States have declined in recent years to the point that the overall rate has been a negative number. Many customers of financial entities do not save money because it is not convenient for such customers to consistently add money to an account, such as a savings account, or because the customer simply does not think about adding money to a savings account when the customer performs other transactions with the financial services entity. Also, customers may not be interested in adding money to a savings account because the customers may feel that a transfer of money from, for example, a checking account to a savings account would have to be for an amount of money that the customer is not comfortable in removing from the customer's checking account. Thus, financial services entities need to offer convenient and effective ways for their customers to save money for retirement, vacations, home purchases, etc.

SUMMARY

In one general aspect, the present invention is directed to systems and methods that are useful for facilitating the transfer of funds between financial accounts. Embodiments permit a user to seamlessly transfer a predetermined or other monetary amount from, for example, a funding account (e.g., a checking (debit) account) to at least one receiving account (e.g., a second checking account, a savings account, an investment account, a folder within the funding account, etc.).

Those and other details, objects, and advantages of the present invention will become better understood or apparent from the following description and drawings showing embodiments thereof.

BRIEF DESCRIPTION OF THE DRAWINGS

Various embodiments of the present invention are described herein by way of example in conjunction with the following figures, wherein:

FIG. 2 illustrates a screen shot of an electronic banking interface according to an embodiment of the present invention;

FIG. 6 illustrates a screen shot of an electronic banking interface according to an embodiment of the present invention;

FIG. 8 illustrates an electronic banking icon according to an embodiment of the present invention;

FIG. 9 illustrates an electronic banking icon according to an embodiment of the present invention;

FIG. 10 illustrates a screen shot of an electronic banking interface according to an embodiment of the present invention;

FIG. 11 illustrates a screen shot of an electronic banking interface according to an embodiment of the present invention.

DESCRIPTION

Various embodiments of the present invention are directed to systems and methods that assist users of a financial services entity in saving money. In various embodiments, a user may select an icon that is graphically presented to the user during, for example, an electronic or online (e.g., Internet) banking session. Selection of the icon triggers the transfer of funds (i.e., a predetermined amount of money) from a funding account (e.g., a checking account) to at least one receiving account (e.g., a second checking account, a savings account, an investment account, etc.).

Figure 1:
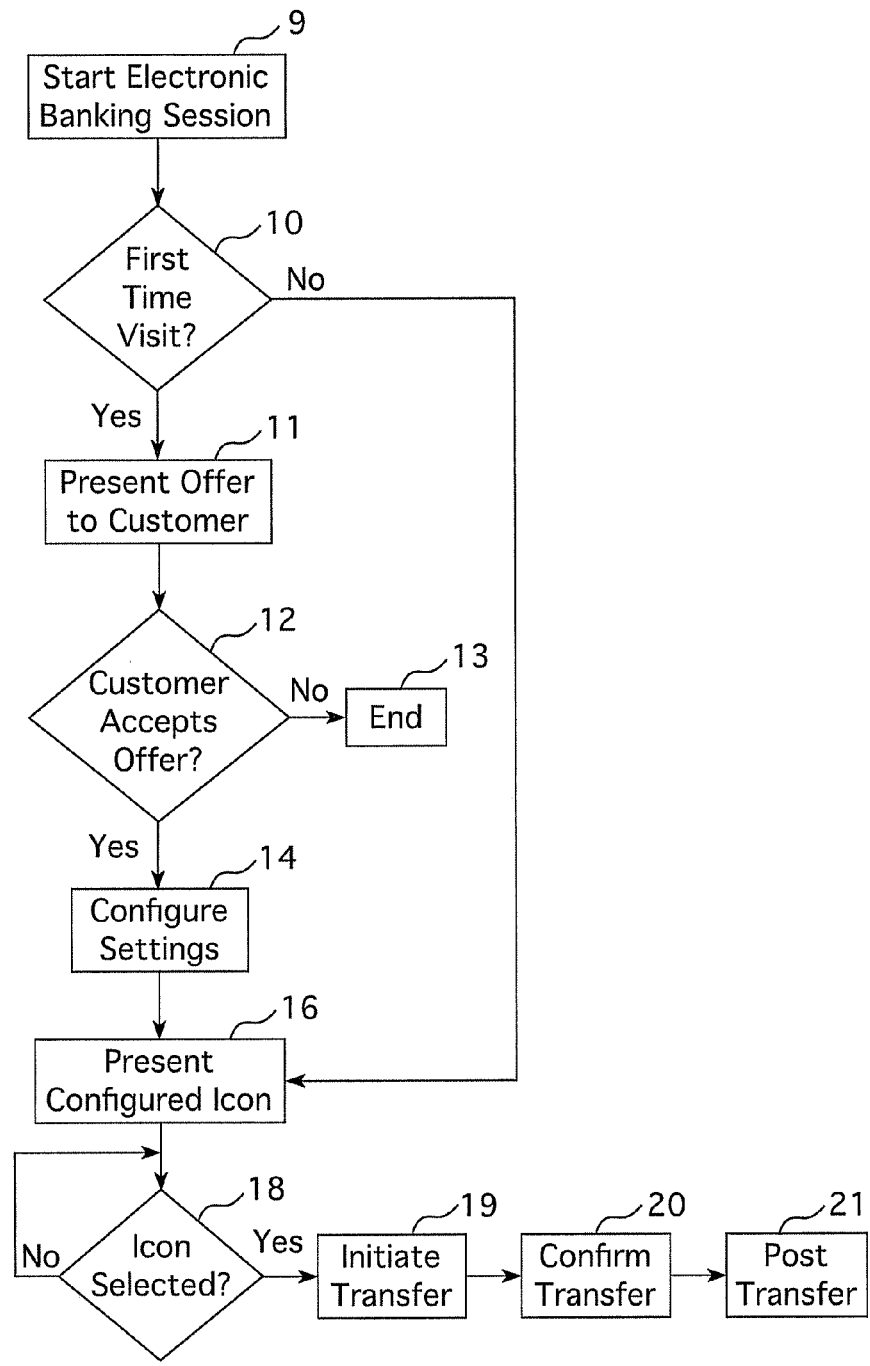
FIG. 1 illustrates a flowchart of an embodiment of a method for facilitating transfer of money between the accounts of a customer of a financial services entity.

FIG. 1 illustrates a flowchart of an embodiment of a method for facilitating transfer of money between the accounts of a user of a financial services entity. At step 9, an electronic or online banking session is initiated by the user. At step 10, the process determines whether the user's current initiation of the electronic banking session is the first time for that particular user. If so, at step 11 the process presents an offer to participate in the funds transfer program as described herein. According to various embodiments, the offer may be presented to the user in response to the user selecting an icon. At step 12, the process determines whether the user has accepted the offer. If not, the process ends at step 13. If the user has accepted the offer, at step 14 the user may configure the settings for future transfers that will happen between the user's accounts when the icon is selected by enrolling in the funds transfer program. To enroll, the user designates the funding account, at least one receiving account, an icon to represent the funds transfer, and the amount of funds to be transferred. When more than one receiving account is designated, the user assigns a percentage of funds transfer amount to each receiving account. The user must accept at least one of a term and a disclosure for the funds transfer program. A confirmation may be sent to the user. At step 16, a configured icon is presented to the user that includes the configuration settings that were specified at step 14 during enrollment.

At step 18, the process determines whether the customer has selected (i.e., "clicked on") the icon. If not, the process waits until the customer selects the icon. If the customer selected the icon as determined at step 18, at step 19 the process initiates a transfer of funds from a funding account specified during configuration at step 14 to at least one receiving account specified during configuration at step 14. In various embodiments, the funds transfer occurs in real time, but will not occur if the customer has insufficient funds in the funding account from which the funds will be withdrawn or the receiving account is invalid. Also, in various embodiments the account to which the funds will be transferred can be specified in the default (i.e., if the customer does not configure the setting) to be the customer's savings account, growth account, investment account, IRA account, 401(k)

account, 529 Plan savings account, money market account, etc. At step 20, the customer is prompted to confirm the transfer and at step 21 the transfer is posted to the customer's accounts.

Figure 2:
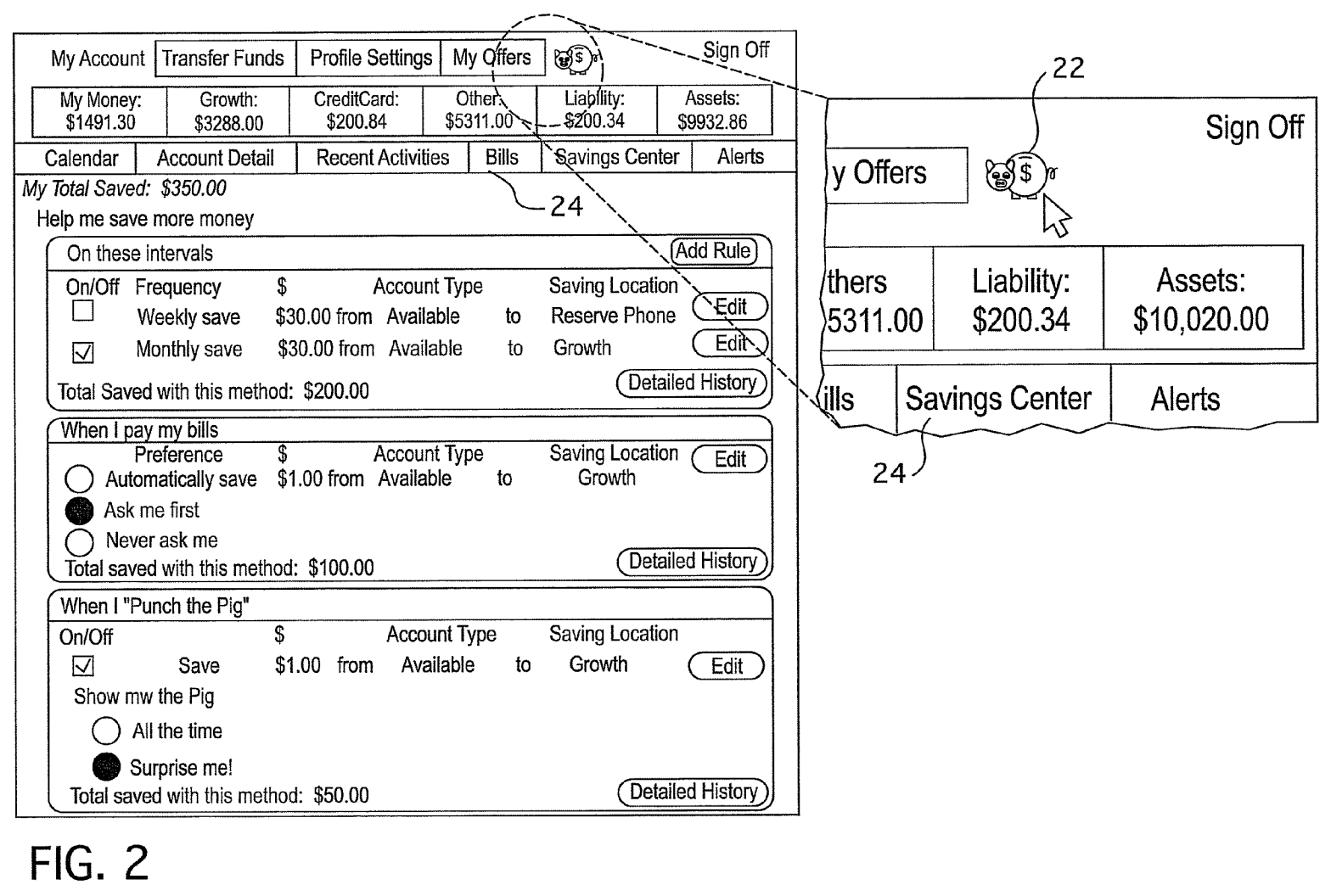
Figure 3:
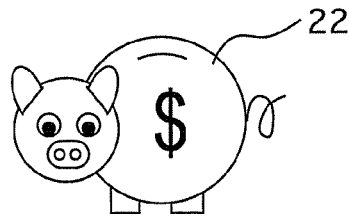
FIG. 3 illustrates an electronic banking icon according to an embodiment of the present invention.
Figure 4:
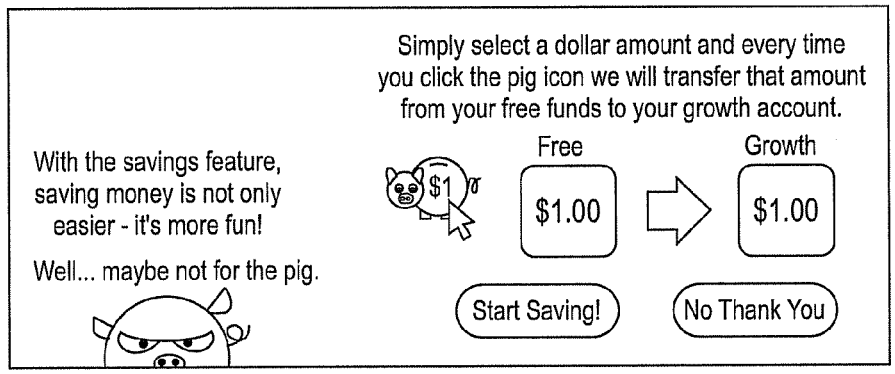
FIG. 4 illustrates a screen shot of an electronic banking interface according to an embodiment of the present invention.
Figure 5:
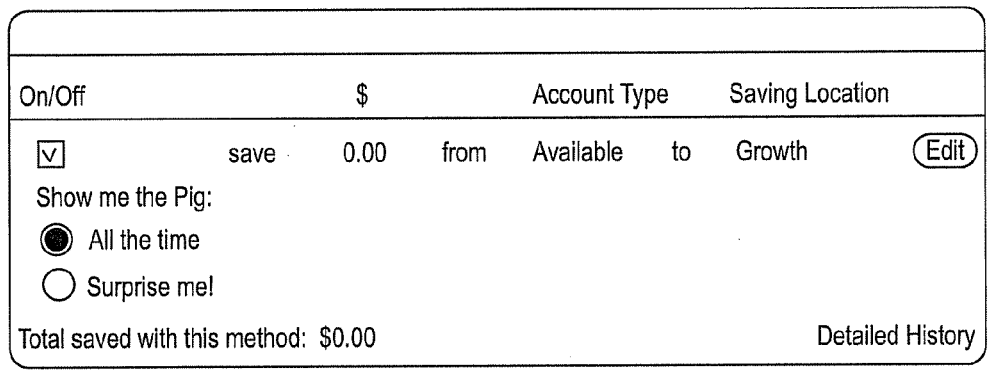
FIG. 5 illustrates a screen shot of an electronic banking interface according to an embodiment of the present invention.

FIG. 2 illustrates a screen shot of an electronic banking interface according to an embodiment of the present invention. As can be seen in FIGS. 2 and 3, the interface includes an initial icon 22. The icon 22 is illustrated as a pig, which represents a piggy bank, having a dollar sign ("$") with no numerical value assigned (FIG. 3). In various embodiments, the icon 22 may be an icon that is chosen from a list by the customer or an icon that is uploaded by the customer. FIG. 4 illustrates a screenshot of a screen in which the customer is asked whether the customer would like to participate in the funds transfer program as described herein. FIG. 5 illustrates a screenshot of a screen that allows the customer to configure settings during enrollment in the funds transfer program. In the configuration screen of FIG. 5, the customer may specify when the icon appears (e.g., always during electronic banking sessions or randomly (e.g., there is a 1 in 3 chance of the icon appearing)), the amount that will be transferred between accounts when the icon is selected, the accounts specified as the funding and receiving accounts for transfers and whether the function is enabled (on) or disabled (off).

Figure 7:
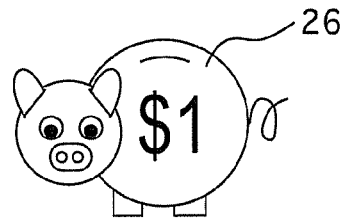
FIG. 7 illustrates an electronic banking icon according to an embodiment of the present invention.

FIG. 6 illustrates a configuration screen that is presented to the customer when the customer selects a savings center tab 24 as illustrated in FIG. 2 after initial configuration. After configuration, an icon 26 as illustrated in FIG. 7 is displayed according to the configuration settings. The icon 26 includes a dollar amount that was specified as the amount that will be transferred between accounts when the icon 26 is selected.

FIG. 8 illustrates the electronic banking icon 26 according to an embodiment of the present invention. The icon 26 is shown with a customized cursor 28 that, as it moves toward the icon 26, graphically represents a boxing glove. FIG. 9 illustrates the electronic banking icon 26 according to an embodiment of the present invention. The icon 26 is shown as changing its graphical image as the cursor 28 selects the icon 26. In various embodiments, sound effects, including sound effects that are uploaded or selected by the user, could be played as the icon 26 is selected. FIG. 10 illustrates a screen shot of an electronic banking interface according to an embodiment of the present invention. The screen of FIG. 10 could be presented to the user as a confirmation after the user selects the icon 26 to initiate a funds transfer.

FIG. 11 illustrates a screenshot of a savings history screen that permits the customer to view a history of funds transfers made using the funds transfer program described herein. The screen illustrates the total amount saved and individual transaction information using a window 40 (e.g., a pop-up window).

Figure 12:
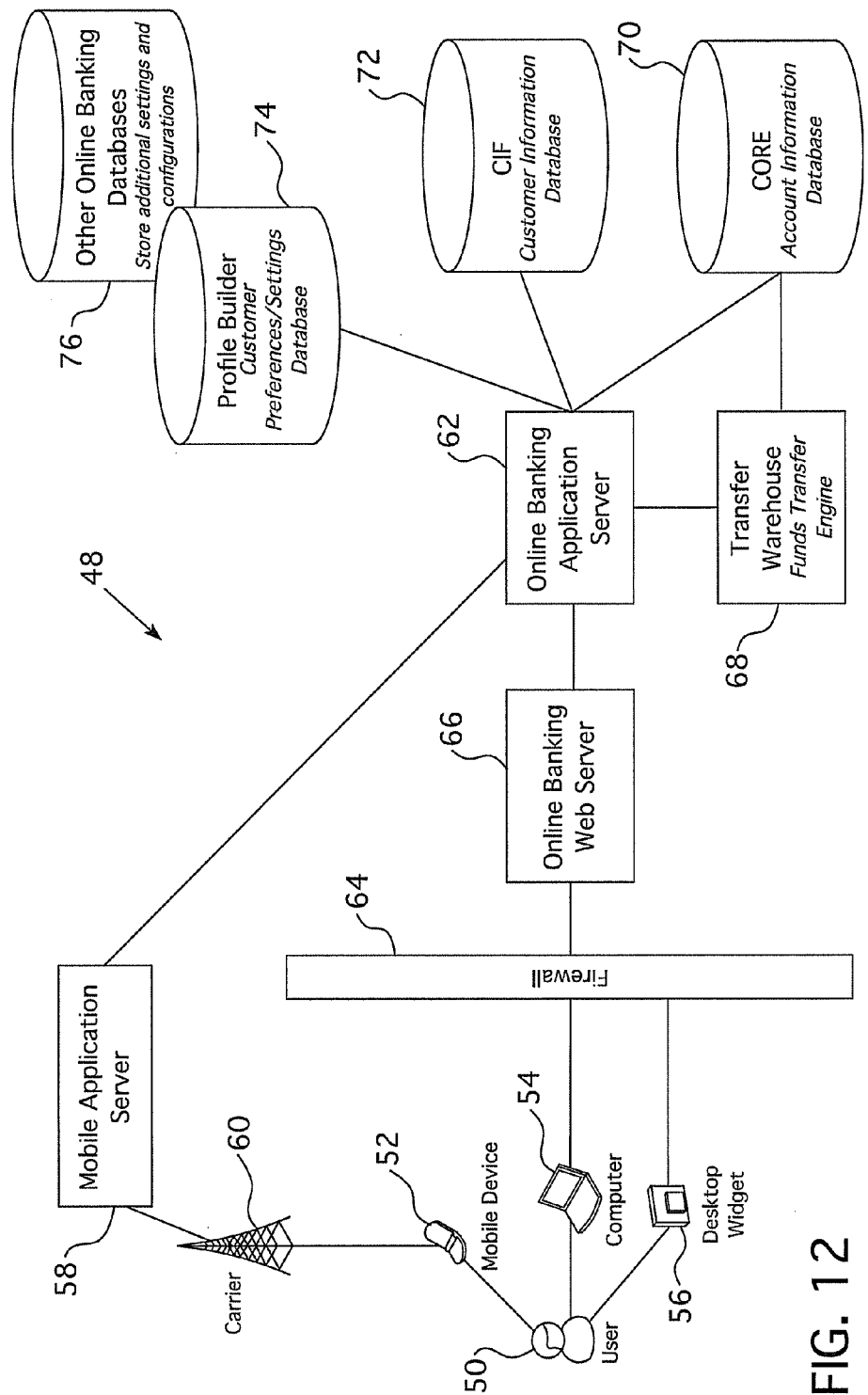
FIG. 12 illustrates an embodiment of a system in which embodiments of the present invention may be used.

FIG. 12 illustrates an embodiment of a system 48 in which embodiments of the present invention may be used. A user 50 may utilize a mobile device 52, a computer 54, a desktop widget 56, or any other suitable device. The mobile device 52 accesses, via a mobile application server 58 and a wireless carrier 60, an online banking application server 62. The online banking application server 62 may perform some or all of the steps of the funds transfer methods as described in various embodiments herein. The computer 54 and the desktop widget 56 access the online banking application server 62 via a firewall 64 protected online banking web server 66.

The online banking application server 62 is in communication with a transfer warehouse (funds transfer engine) 68, an account information database 70, a customer information database 72, a customer preferences/settings database 74, and other online banking databases 76 that store additional settings and configurations.

In various embodiments, the financial services entity may match all or part of the amount of funds that are transferred using the funds transfer program described herein. In various embodiments, the financial services entity may match all or part of the amount of funds that are transferred when the user has reached a predetermined transferred amount or when a certain goal has been attained by the user.

Various embodiments of the present invention may be implemented on computer-readable media. The terms "computer-readable medium" and "computer-readable media" in the plural as used herein may include, for example, magnetic and optical memory devices such as diskettes, compact discs of both read-only and writeable varieties, optical disk drives, hard disk drives, etc. A computer-readable medium may also include memory storage that can be physical, virtual, permanent, temporary, semi-permanent and/or semi-temporary. A computer-readable medium may further include one or more data signals transmitted on one or more carrier waves.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention.

What is claimed is:

1. A computer-assisted method for facilitating transfers between financial accounts, the method comprising:

enrolling a user in a funds transfer program, wherein enrolling the user includes designating a funding account, designating at least one receiving account, designating an icon representing a funds transfer, and designating a predetermined amount of funds to be transferred;

accepting a funds transfer request via the selection of the icon, by the user, wherein the icon represents a designated transfer of the predetermined amount of funds between the funding account and the at least one receiving account; and transferring the amount of funds from the funding account to the at least one receiving account.

2. The method of claim 1, wherein designating the at least one receiving account further comprises assigning a percentage of the funds amount to each receiving account.

3. The method of claim 1, further comprising accepting, by the user, at least one of a term and a disclosure.

4. The method of claim 1, further comprising sending a user confirmation.

5. The method of claim 1, further comprising ensuring sufficient funds are available in the funding account prior to transferring.

6. The method of claim 1, further comprising validating the at least one receiving account.

7. The method of claim 1, further comprising sending a notice to the user if the at least one receiving account is invalid.

8. The method of claim 1, further comprising posting a funds transfer program transaction to the funding account and the at least one receiving account.

9. The method of claim 1, further comprising transferring a matching funds amount to the at least one receiving account upon meeting a criterion of a matching savings plan, wherein the matching funds amount is calculated based on the funds transfer amount.

10. A system for facilitating transfers between financial accounts, the system comprising:
- a database; and
- a processor configured to:
  - enroll a user in a funds transfer program, wherein enrolling the user includes designating a funding account, designating at least one receiving account, designating an icon representing a funds transfer, and designating a predetermined amount of funds to be transferred;
  - accept a funds transfer request via the selection of the icon, by the user, wherein the icon represents a designated transfer of the predetermined amount of funds between the funding account and the at least one receiving account; and
  - transfer the amount of funds from the funding account to the at least one receiving account.

11. The system of claim 10, wherein to designate the at least one receiving account, the processor is further configured to assign a percentage of the funds amount to each receiving account.

12. The system of claim 10, wherein the processor is further configured to require the user to accept at least one of a term and a disclosure.

13. The system of claim 10, wherein the processor is further configured to send a user confirmation.

14. The system of claim 10, wherein the processor is further configured to ensure sufficient funds are available in the funding account prior to transferring.

15. The system of claim 10, wherein the processor is further configured to validate the at least one receiving account.

16. The system of claim 10, wherein the processor is further configured to send a notice to the user if the at least one receiving account is invalid.

17. The system of claim 10, wherein the processor is further configured to post a funds transfer program transaction to the funding account and the at least one receiving account.

18. The system of claim 10, wherein the processor is further configured to transfer a matching funds amount to the at least one receiving account upon meeting a criterion of a matching savings plan, wherein the matching funds amount is calculated based on the funds transfer amount.

19. An apparatus for facilitating transfers between financial accounts, the apparatus comprising:
- means for enrolling a user in a funds transfer program, wherein enrolling the user includes designating a funding account, designating at least one receiving account, designating an icon representing a funds transfer, and designating a predetermined amount of funds to be transferred;
- means for accepting a funds transfer request via the selection of the icon, by the user, wherein the icon represents a designated transfer of the predetermined amount of funds between the funding account and at least one receiving account; and
- means for transferring the amount of funds from the funding account to the at least one receiving account.

\* \* \* \* \*